(12) United States Patent
Peebles

(10) Patent No.: US 8,448,905 B2
(45) Date of Patent: May 28, 2013

(54) AIRCRAFT WITH AERODYNAMIC LIFT GENERATING DEVICE

(76) Inventor: Patrick William Peebles, Trevignano Romano (IT)

( * ) Notice: Subject to any disclaimer, the term of this patent is extended or adjusted under 35 U.S.C. 154(b) by 606 days.

(21) Appl. No.: 12/225,589

(22) PCT Filed: Apr. 2, 2007

(86) PCT No.: PCT/GB2007/001186
§ 371 (c)(1),
(2), (4) Date: Jan. 13, 2011

(87) PCT Pub. No.: WO2007/113525
PCT Pub. Date: Oct. 11, 2007

(65) Prior Publication Data
US 2011/0101173 A1 May 5, 2011

(30) Foreign Application Priority Data

Mar. 31, 2006 (GB) .................................. 0606518.9

(51) Int. Cl.
*B64C 23/02* (2006.01)
(52) U.S. Cl.
USPC ............................................. 244/206; 244/10
(58) Field of Classification Search
USPC .................. 244/206, 10, 19, 21, 39
See application file for complete search history.

(56) References Cited

U.S. PATENT DOCUMENTS

| 1,875,276 | A | * | 8/1932 | Steigert | 244/10 |
| 2,050,903 | A | * | 8/1936 | Topliff | 244/9 |
| 2,344,515 | A | * | 3/1944 | Massey | 244/10 |
| 2,397,189 | A | * | 3/1946 | Main | 244/9 |
| 4,307,677 | A | * | 12/1981 | Jastram et al. | 114/167 |
| 6,231,004 | B1 | * | 5/2001 | Peebles | 244/10 |
| 6,527,229 | B1 | * | 3/2003 | Peebles | 244/204.1 |
| 7,461,811 | B2 | * | 12/2008 | Milde, Jr. | 244/9 |
| 7,654,486 | B2 | * | 2/2010 | Milde, Jr. | 244/9 |

* cited by examiner

*Primary Examiner* — Christopher P Ellis
(74) *Attorney, Agent, or Firm* — William H. Bollman

(57) ABSTRACT

An aircraft (1) comprising: a fuselage (2), opposing wings (3, 4) either side of the fuselage (2), each wing (3, 4) supports at least one tangential flow rotor (5) and has a rotational axis. At least one tail section (3A) is disposed on each wing (3, 4) for forming a wing trailing edge. The tail sections (3A) are moveable about the, or each, rotor axis (X) relative to the fuselage (2) so as to provide, in use of said aircraft (1), variable thrust forces, whereby in use, movement of the or each tail section (3A) controls the flight of the aircraft (1). Lift is generated by way of a shroud (12) which forms an extension to the tail section (3A) curved surface or cowl to jointly cover a proportion of the circumference of the rotor. Ideally the shroud (12) and tail section curved surfaces create a vortex chamber generally within the rotor. An alternative embodiment includes a vertical axis fan (6) is provided on the fuselage (2) to adjust aircraft "pitch".

20 Claims, 3 Drawing Sheets

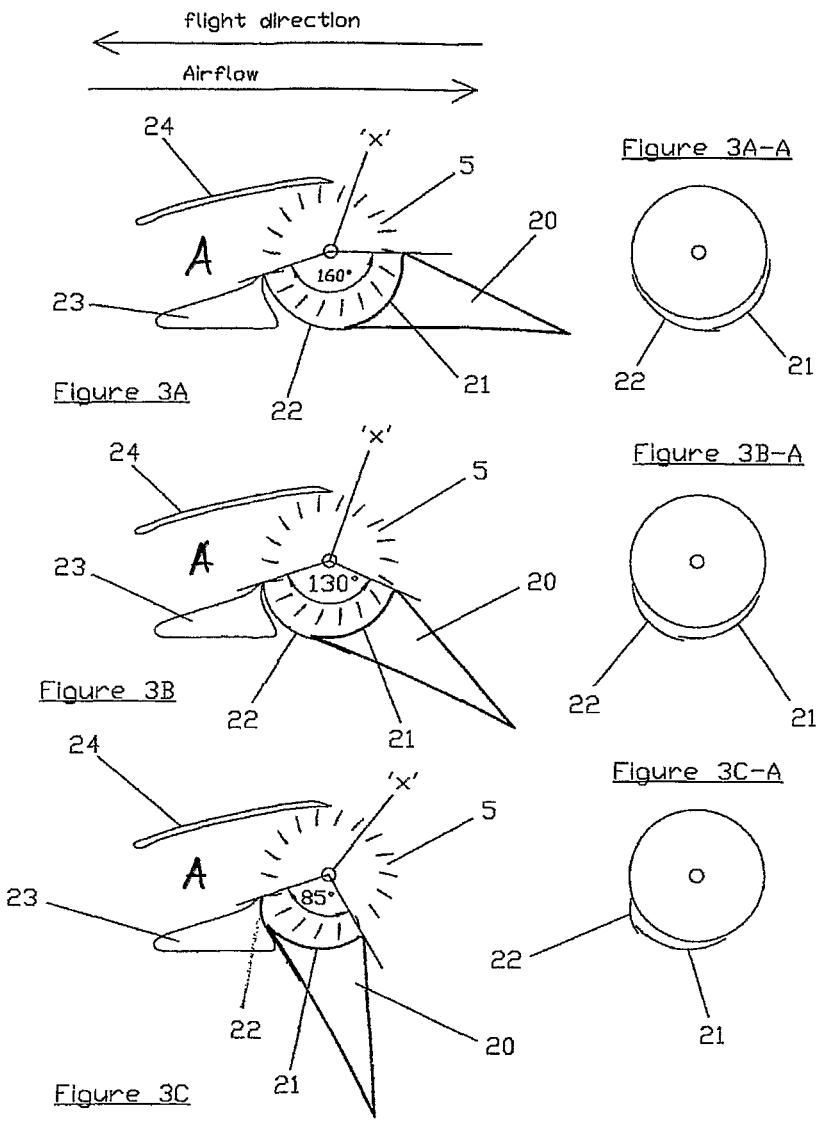

AIRCRAFT WITH AERODYNAMIC LIFT GENERATING DEVICE

BACKGROUND

The present invention relates to an aircraft with an aerodynamic lift generating device.

PRIOR ART

It is known to use lift generating devices for powering aircraft. Such devices are disclosed in my prior Patents EP-B-0 918 686 and U.S. Pat. No. 6,527,229, the contents of which are incorporated herein by reference. Such lift generating devices provide an alternative means of propulsion to conventional propellers and the like, and lead to improved efficiencies.

European Patent EP-B-0 918 686 describes a lifting member that may be employed in either a liquid (hydrofoil) or gas (aerofoil). A wing like member is disclosed in which a spanwise extending rotor is housed. The rotor is positioned adjacent the leading edge and defines a fluid intake region. As the rotor rotates about a drive axis, fluid is drawn in and forced across the hydrofoil or aerofoil so as to create lift.

The present invention seeks to provide an aircraft with an improved lift generating device in which the thrust direction can be altered. Therefore the invention finds particular application in aircraft referred to as vertical take-off and landing (VTOL) or aircraft referred to as short take-off and landing (STOL) as the improvement provides both vertical thrust for vertical take off and forward thrust for propulsion.

SUMMARY OF THE INVENTION

According to the present invention there is provided an aircraft comprising: a fuselage, opposing wings either side of the fuselage, each wing supporting at least one tangential flow rotor having a rotational axis, and at least one tail section for each wing forming a wing trailing edge, said tail section being moveable about the or each rotor axis relative to the fuselage so as to provide, in use of said aircraft, variable thrust vectors, whereby in use, movement of the or each tail section is used to control flight of the aircraft.

Preferably movement of the or each tail section is vectored by rotating the wing casing whereby the lift component increases while the thrust is reduced. This allows the aircraft forward flight as well as vertical take off and facilitates vertical landing.

Preferably the or each tail section includes a curved surface which covers a proportion of the circumference of the rotor. The curved surface or cowl may have a radius of curvature substantially equal to the radius of curvature of the rotor. The curved surface of the tail section may be offset relative to the curved circumference of the rotor.

Preferably the or each tail section includes a shroud extending therefrom, said shroud including a curved surface or cowl which covers a proportion of the circumference of the rotor.

Advantageously the shroud forms an extension to the tail section curved surface to jointly cover a proportion of the circumference of the rotor. Preferably the shroud and tail section curved surfaces create a vortex chamber generally within the rotor.

In one preferred embodiment the shroud is fixed to the tail section. Preferably the tail section and shroud are moveable about the or each rotor axis relative to the fuselage.

In another particularly preferred embodiment the shroud is connected to a fixed point of a wing, and is adapted to slide over a portion of the tail section whereby the proportion of the circumference of the rotor covered by the shroud curved surface or cowl and tail section curved surface or cowl varies as said tail section moves about the, or each, rotor axis.

The radius of curvature of the shroud curved surface or cowl changes as said tail section moves about the or each rotor axis. The radius of curvature of the shroud curved surface or cowl may be non-uniform along its length.

Preferably a wing leading edge is provided for each wing in the form of an air input duct to allow passage of air to said rotor. Preferably the duct is variable in size to control the amount of air passing therethrough whereby to control "roll" of the aircraft.

Preferably a vertical axis fan is provided at or near the rear of the fuselage to control the aircraft "pitch".

An embodiment of the invention will now be described with reference to the drawings in which:

BRIEF DESCRIPTION OF THE FIGURES

FIGS. 3A to 3C shows a schematic cross section view of a second embodiment of tail section and shroud, along with an input duct.

DETAILED DESCRIPTION OF PREFERRED EMBODIMENTS OF THE INVENTION

Figure 1:
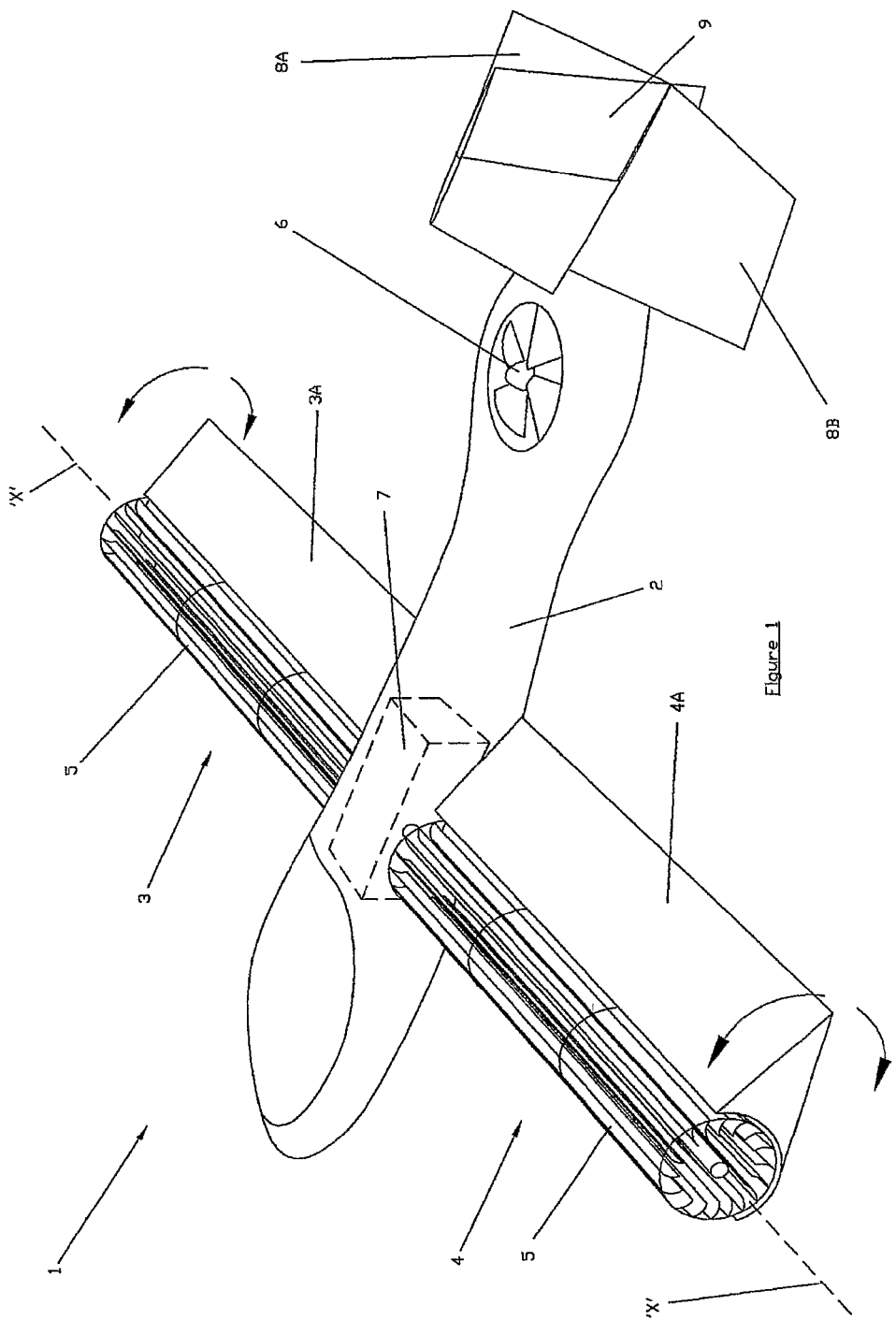
FIG. 1 shows a schematic perspective view of an aircraft in accordance with one aspect of the invention.

Referring to FIG. 1 there is shown an aircraft 1. Aircraft 1 has a fuselage 2, and opposing wings or aerofoils 3, 4 either side of the fuselage 2. Each wing 3, 4 supports a tangential flow rotor 5 having a rotational axis "X". The tangential flow rotor is housed within a rotor cavity.

Wing 3 has a tail section 3A forming a wing trailing edge. Tail section 3A is moveable about the rotor axis "X" relative to the fuselage 2. Similarly wing 4 has a tail section 4A forming a wing trailing edge. Tail sections 3A, 4A are moveable about the rotor axis "X" relative to the fuselage 1, thereby providing, in use of the aircraft, variable thrust vectors to create aircraft lift and forward movement as more fully described below.

In use of aircraft 1, movement of each tail section is used, inter alia, to control flight of the vehicle, especially to allow the aircraft forward flight as well as vertical take off.

Movement of the tail section in addition to providing lift can be used to control "roll" of the aircraft.

A vertical axis fan 6 is provided on the fuselage 2 to adjust aircraft "pitch". Rear tail wings 8A, 8B and rudder 9 may also be provided. In this sense it is appreciated that in a second aspect of the invention there is provided an aircraft comprising: a fuselage, opposing wings either side of the fuselage, each wing supporting at least one tangential flow rotor having a rotational axis, and at least one tail section for each wing forming a wing trailing edge, said tail section being moveable about the or each rotor axis relative to the fuselage so as to provide, in use of said aircraft, variable thrust vectors, whereby in use, movement of the or each tail section being used controls flight of the aircraft and a vertical axis fan located in the tail section and adapted to provide pitch control.

A motor or engine 7 is provided to rotate each flow rotor 5. Alternatively a magnetic field may be established so that on passing an electric current through the rotor, the rotor rotates.

Alternatively an electric or magnetic field can be established by inductive coupling. Other drive systems include a turbo prop engine, jet engine or conventional piston driven engine.

Figure 2A:
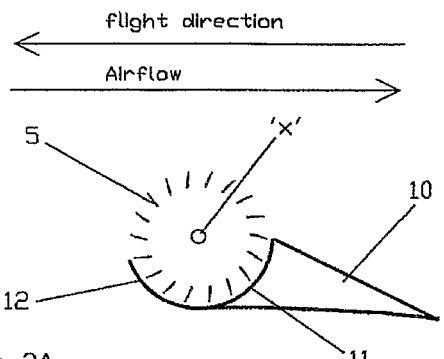
FIGS. 2A to 2C shows a schematic cross section view of a first embodiment of tail section and shroud.
Figure 2B:
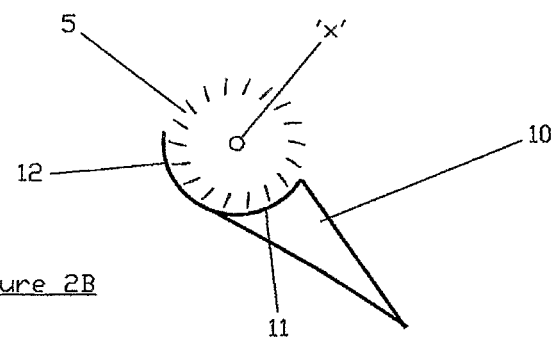
Figure 2C:
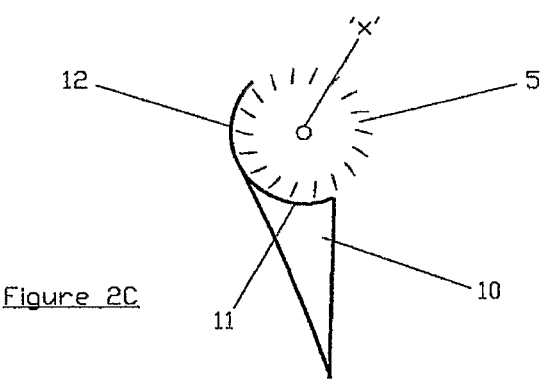

Referring now to FIGS. 2A to 2C there is shown a cross section view of various positions of the tail section of a first embodiment. In FIGS. 2A to 2C, a tail section 10 (which may be used as the tail section 3A or 4A in FIG. 1) includes a curved surface or cowl 11 which covers a proportion of the circumference of a clockwise-rotating tangential flow rotor 5 which creates airflow over the top of the tail section 10 to deliver flight thrust in the opposite direction. The curved surface or cowl may have a radius of curvature substantially equal to the radius of curvature of the rotor 5.

Tail section 10 includes a shroud 12 extending therefrom. Shroud 12 includes a curved surface or cowl which covers a proportion of the circumference of the rotor. The shroud 12 is fixed to and forms an extension to the tail section curved surface or cowl 11 to jointly cover a proportion of the circumference of the rotor and again has a radius of curvature substantially equal to the radius of curvature of the rotor. The shroud 12 and tail section curved surface or cowl 11 create a vortex chamber generally within the rotor. The curve of the shroud 12 and surface 11 could be offset relative to the curved circumference of the rotor (as shown with reference to FIGS. 3A-A-3C-A below). The tail section 10 and shroud 11 are moveable about the rotor axis "X" relative to the fuselage such as shown in FIGS. 2A to 2C whereby to provide, in use of the aircraft, variable thrust vectors.

The position shown in FIG. 2A would provided forward thrust with some lift to the aircraft (e.g. during normal flight), the position shown in FIG. 2B would provide forward thrust and lift to the aircraft (e.g. for slower flight), and the position shown in FIG. 2C provides vertical lift to the aircraft.

Referring now to FIGS. 3A to 3C there is shown a cross section view of various positions of the tail section of a second embodiment. In FIGS. 3A to 3C, a tail section 20 (which may be used as the tail section 3A or 4A in FIG. 1) includes a curved surface 21 which covers a proportion of the circumference of a tangential flow rotor 5. The curved surface 21 may have a radius of curvature substantially equal to the radius of curvature of the rotor 5. The curved surface 21 of the tail section 20 may be offset relative to the curved circumference of the rotor as shown in FIGS. 3A-A, 3B-A and 3C-A.

As the wing 20, 21 is rotated downwards, the shroud reduces the angle of coverage of the rotor, this firstly increases the velocity of the vortex and secondly the air output angle is altered. As a result the fan efficiency is increased thus making the fan more suitable for hovering or vertical take off.

Tail section 20 includes a shroud 22 extending therefrom. Shroud 22 includes a curved surface which covers a proportion of the circumference of the rotor. The shroud 22 has one end fixed to a lower air input duct member 23 on the wing and the other end overlaps the tail section 20 and slides over it. Thus the proportion of the circumference of the rotor covered by the shroud 22 curved surface and tail section curved surface 21 varies as the tail section 20 moves about the rotor axis "X" as shown in FIGS. 3A to 3C. As shown also in FIGS. 3A-A, 3B-A and 3C-A, the radius of curvature of the shroud 22 curved surface changes as the tail section 20 moves about the or each rotor axis, and the radius of curvature of the shroud curved surface is non-uniform along its length.

The shroud 22 and tail section curved surface 21 create a vortex chamber generally within the rotor having a vortex boundary defined by the combined length of the shroud 22 and tail section curved surface 21. The shape of the vortex may also change by changes in shape of the gap between the shroud 22 and curved surface 21 and the circumference of the rotor. The tail section 20 and shroud 22 when moved about the rotor axis "X" relative to the fuselage such as shown in FIGS. 3A to 3C provide, in use of the aircraft, variable thrust vectors.

Lower air input duct member 23, in combination with an upper air input duct member 24 create a wing leading edge in the form of an air input duct "A" to allow passage of air to said rotor. The upper and lower air input duct members may be moved towards or away from each other so that the input duct "A" is variable in size to control the amount of air passing therethrough, whereby to control "roll" of the aircraft.

The position shown in FIG. 3A would provided forward thrust with some lift to the aircraft (e.g. during normal flight). In this position air enters the wing through the input duct "A" flowing between the members 23, 24 to be accelerated by rotor 5 rotating clockwise over the vortex in the rotor. The air is ejected over the tail section 20. The angle formed between the opposing ends of the shroud 22 and axis "X" and curved section 21 and axis "X" may be about 160°. In this FIG. 3A the radius of curvature of the shroud 22 and curved section is similar to that of the circumference of the rotor although it is moved away from the motor radially by 10 to 20% of the radius.

The position shown in FIG. 3B would provide forward thrust and lift to the aircraft (e.g. for slower flight). In this position air enters the wing through the input duct "A" flowing between the members 23,24 to be accelerated by rotor 5 rotating clockwise over the vortex in the rotor. The air is ejected over the tail section 20. The angle formed between the opposing ends of the shroud 22 and axis "X" and curved section 21 and axis "X" may be about 130°. The combined length of the shroud 22 and tail section curved surface 21 is shorter than in FIG. 3A, and the radius of curvature of the shroud 22 changes.

The position shown in FIG. 3C would provide vertical lift to the aircraft. In this position air enters the wing through the input duct "A" flowing between the members 23,24 to be accelerated by rotor 5 rotating clockwise over the vortex in the rotor. The air is ejected over the tail section 20. The angle formed between the opposing ends of the shroud 22 and axis "X" and curved section 21 and axis "X" may be about 80°-90°, e.g. 85°. The combined length of the shroud 22 and tail section curved surface 21 is shorter than in FIG. 3B and the radius of curvature increases still further.

The invention may take a form different to that specifically described above. For example each wing could support two or more rotors, e.g. axially aligned in side by side relationship. Also each wing could support two or more tail sections. Also the shroud of FIGS. 3A to 3C could slide over the curved section 21 of tail section 20 rather than the face of tail section 20 shown.

Similarly it is appreciated that differential drive of the rotors with respect to one another permits the aircraft to bank to permit turning.

Preferred embodiments of the invention have been described and it will be understood that features from one or more of the aforementioned embodiments may be incorporated into a different aircraft. For example a glider or hydrofoil.

It is understood that although reference has been made to an aircraft per se, it will be understood that the aircraft may be an unmanned vehicle such as a Drone or unmanned aerial vehicle (UAV).

Various embodiments of the invention have been described, by way of example only and it will be appreciated that variation may be made to the examples described without departing from the scope of the invention.

The invention claimed is:

1. An aircraft comprising: a fuselage, opposing wings either side of the fuselage, each wing supporting at least one tangential flow rotor having a rotational axis, and at least one tail section for each wing forming a wing trailing edge, said tail section being moveable about the or each rotor axis relative to the fuselage so that, in use of said aircraft, variable thrust vectors are established, whereby in use, movement of the or each tail section is used to control flight of the aircraft.

2. An aircraft according to claim 1 comprises a means for displacing the, or each, tail section so as to allow the aircraft forward flight as well as vertical take off.

3. An aircraft according to claim 1 wherein the, or each, tail section includes a curved surface or cowl which extends around a proportion of the circumference of the rotor.

4. An aircraft according to claim 3 wherein the, or each, curved surface or cowl extends around at least 25% of the circumference of the rotor and preferably 40% of the circumference of the rotor.

5. An aircraft according to claim 1 wherein the curved surface or cowl has a radius of curvature substantially equal to the radius of curvature of the rotor.

6. An aircraft according to claim 1 wherein the curved surface or cowl of the tail section is offset relative to the curved circumference of the rotor.

7. An aircraft according to claim 1 wherein the shroud and tail section curved surfaces are arranged to create a vortex chamber generally within a rotor cavity.

8. An aircraft according to claim 1 wherein the shroud is fixed to the tail section.

9. An aircraft according to claim 1 wherein the tail section and shroud are moveable relative one to another and about the or each rotor axis relative to the fuselage.

10. An aircraft comprising a fuselage, opposing wings either side of the fuselage, each wing supporting at least one tangential flow rotor having a rotational axis, and at least one tail section for each wing forming a wing trailing edge, said tail section being moveable about the or each rotor axis relative to the fuselage whereby, in use of said aircraft, variable thrust is generated by movement of the or each tail section so as to control flight of the aircraft wherein the shroud is connected to a fixed portion on a wing, and is adapted to slide over a portion of the tail section whereby the proportion of the circumference of the rotor covered by the shroud curved surface or cowl and tail section curved surface varies as said tail section moves about the or each rotor axis.

11. An aircraft according to claim 10 comprises a means for displacing the, or each, tail section so as to allow the aircraft forward flight as well as vertical take off.

12. An aircraft according to claim 10 wherein the, or each, tail section includes a curved surface or cowl which extends around a proportion of the circumference of the rotor.

13. An aircraft according to claim 10 wherein the, or each, curved surface or cowl extends around at least 25% of the circumference of the rotor and preferably 40% of the circumference of the rotor.

14. An aircraft according to claim 10 wherein the curved surface or cowl has a radius of curvature substantially equal to the radius of curvature of the rotor.

15. An aircraft according to claim 10 wherein the curved surface or cowl of the tail section is offset relative to the curved circumference of the rotor.

16. An aircraft according to claim 10 wherein the shroud and tail section curved surfaces are arranged to create a vortex chamber generally within a rotor cavity.

17. An aircraft according to claim 10 wherein the shroud is fixed to the tail section.

18. An aircraft according to claim 10 wherein the tail section and shroud are moveable relative one to another and about the or each rotor axis relative to the fuselage.

19. An aircraft according to claim 10 wherein a wing leading edge is provided for each wing in the form of an air input duct to allow passage of air to said rotor.

20. An aircraft according to claim 19 wherein the duct is variable in size to control the amount of air passing there through whereby to control "roll" of the aircraft.

* * * * *